(12) United States Patent  (10) Patent No.: US 6,693,716 B2
Sieckmann                      (45) Date of Patent:     Feb. 17, 2004

(54) METHOD AND APPARATUS FOR OPTICAL MEASUREMENT OF A SURFACE PROFILE OF A SPECIMEN

(75) Inventor: Frank Sieckmann, Bochum (DE)

(73) Assignee: Leica Microsystems Imaging Solutions, Cambridge (GB)

( * ) Notice: Subject to any disclaimer, the term of this patent is extended or adjusted under 35 U.S.C. 154(b) by 64 days.

(21) Appl. No.: 09/973,983

(22) Filed: Oct. 11, 2001

(65) Prior Publication Data

US 2002/0071125 A1 Jun. 13, 2002

(30) Foreign Application Priority Data

Oct. 13, 2000 (DE) .......................................... 100 50 963
Oct. 6, 2001 (DE) .......................................... 101 49 357

(51) Int. Cl.$^7$ .............................................. G01B 11/24
(52) U.S. Cl. ........................ 356/609; 356/601; 382/154; 250/559.22
(58) Field of Search ................................ 356/601, 609; 250/559.22; 382/154; 345/420

(56) References Cited

U.S. PATENT DOCUMENTS 6,556,704 B1 * 4/2003 Chen .......................... 382/154

* cited by examiner

Primary Examiner—Richard A. Rosenberger
Assistant Examiner—Vincent P. Barth
(74) Attorney, Agent, or Firm—Foley & Lardner

(57) ABSTRACT

The object of the invention is a method and an apparatus for optical measurement of a surface profile of a specimen, a series of n images of the specimen being acquired with an image acquisition apparatus in different planes in the z direction of a coordinate system (x, y, z). The image contents of all n images of the resulting image stack are compared to each other in the z direction at each coordinate point (x, y) in order to determine a plane therefrom according to predetermined criteria, assign its plane number (N) to that coordinate point (x, y), and store it in a mask image. The mask image contains all the 3D data of the specimen surface. Processing can be performed using 2D image processing procedures. The 3D information can be quickly and easily retrieved from the mask image. The surface profile can be reconstructed and displayed three-dimensionally.

12 Claims, 5 Drawing Sheets

METHOD AND APPARATUS FOR OPTICAL MEASUREMENT OF A SURFACE PROFILE OF A SPECIMEN

CROSS REFERENCE TO RELATED APPLICATIONS

This invention claims priority of the German patent application 100 50 963.0 which is incorporated by reference herein.

FIELD OF THE INVENTION

The invention concerns a method and an apparatus for optical measurement of a surface profile of a specimen.

BACKGROUND OF THE INVENTION

Several methods for three-dimensional reconstruction of surfaces of microscopic structures are known. In CLSM (confocal laser scanning microscopy) the specimen is scanned point by point in one plane, and an image with very little depth of focus is thereby acquired. With a plurality of images in different planes, and by way of appropriate image processing, the specimen can be depicted three-dimensionally. In CLSM the data can be generated only in very expensive fashion, and high-quality optical components are a prerequisite. A high level of technical complexity is also necessary in another technique in which a 3D reconstruction is achieved by means of a thin line of light directed onto the surface that is to be reconstructed.

The existing methods are expensive, and require not only good technical understanding but also a great deal of alignment work. In addition, the methods are usable only for small areas.

SUMMARY OF THE INVENTION

It is the object of the invention to measure the surface profile of a specimen quickly and economically without contact and without damage to the specimen.

The object is achieved by a method that measures the surface profile of the specimen optically in a three-dimensional coordinate system (x, y, z) and contains the following steps:

acquiring a series of n images of the specimen in different planes in the z direction by means of an image acquisition apparatus, each plane containing a plurality of coordinate points (x, y);

assigning each of the images to a plane in the specimen having a defined plane number;

referring each plane to a common origin $(x_0, y_0)$ in the coordinate system (x, y, z); and generating a mask image using the following procedure for each coordinate point (x, y):

comparing the image contents of all n images at that coordinate point (x, y) to one another in order to determine a plane therefrom according to predetermined criteria, assign its plane number to that coordinate point (x, y), and store it in the mask image.

The object is also achieved by way of an apparatus that measures the surface profile of the specimen optically and contains the following features:

an image acquisition apparatus for acquiring a series of n images of the specimen in various planes in the z direction of a coordinate system (x, y, z), each of the images being assigned to a plane in the specimen having a defined plane number, and each plane being referred to a common origin $(x_0, y_0)$ and each plane containing a plurality of coordinate points (x, y); and a computer that, for each coordinate point (x, y), compares the image contents of all n images at that coordinate point (x, y) to one another in order to determine a plane therefrom according to predetermined criteria and assign its plane number to that coordinate point (x, y) and store it as a mask image.

With the invention, it is possible to ascertain surface profiles of specimens without a great deal of technical complexity. The image acquisition apparatus can comprise simply a camera. For images of smaller or microscopic specimens, a macroscope or microscope together with a camera placed on it is used as the image acquisition apparatus. The data of the surface profiles that are obtained can easily be displayed on a computer.

In particular, microscopic surfaces can be reconstructed by means of conventional light microscopy. In microscopy, specimens having a geometric surface pattern cannot be imaged simultaneously with complete sharpness. Using a suitable design, different focal planes of the specimen are therefore traveled to in controlled and reversible fashion and images in the various focal planes are recorded, preferably with a digital image. A "contour map" of the microscopic specimen surface is automatically calculated therefrom using a computer.

Even a simple microscope having an adjustable-height stage and a CCD camera can be sufficient. Images of the specimen are acquired at different stage heights, i.e. in various focal planes. Because of the depth of field of the microscope, each of the images contains sharp and unsharp regions. From the series of images that are acquired, specific criteria are used, for example, to pick out the sharp regions in each of the individual planes and assign them as plane numbers to the corresponding (x, y) coordinate points. The assignment of a plane number to each (x, y) coordinate is stored in a memory as mask image.

The mask image represents a two-dimensional image that contains only essential data. One advantage of the mask image is that the data volume is greatly reduced. On the one hand, because of the reduction in data volume to two dimensions as opposed to the processing of a three-dimensional image, normal and conventional 2D image processing algorithms can be applied to the mask image. On the other hand, the reduced data volume means that the 3D information can be quickly and easily retrieved from the mask image. The plane number at a predefined (x, y) coordinate can be retrieved from the mask image at any time, and a relative elevation value can thereby be displayed. By multiplying the plane number by the distances between the planes, an absolute elevation value can be indicated in a dimensional unit, e.g. in $\mu$m. In addition, the relative or absolute elevation values can be assembled into a completely sharp three-dimensional image of the specimen surface. A three-dimensional image reconstructed in this fashion thus exhibits greatly improved image quality as compared to conventional microscopic images. In addition, because of the greatly reduced data volume, the surface profile of the specimen can be read out of the mask image quickly and thus displayed on a monitor in real time. The method is also robust, i.e. it is dependable and has little susceptibility to failure.

Furthermore, the procedure of the calculation of the mask image can be accelerated if a reduced image is used, i.e. only every second or third or forth etc. of the pixels in x- and y-direction is taken into account instead of each pixel. The generation of the mask image can be applied to the reduced image. If necessary, a fast running interpolation algorithm can be applied afterwards.

It is moreover advantageous that any standard light microscope can be used for the method according to the present invention, thus yielding an economical alternative to CLSM.

BRIEF DESCRIPTION OF THE DRAWINGS

The invention will be explained in more detail below with reference to the exemplary embodiments depicted in the drawings, in which, schematically in each case.

DETAILED DESCRIPTION OF THE INVENTION

Figure 1:
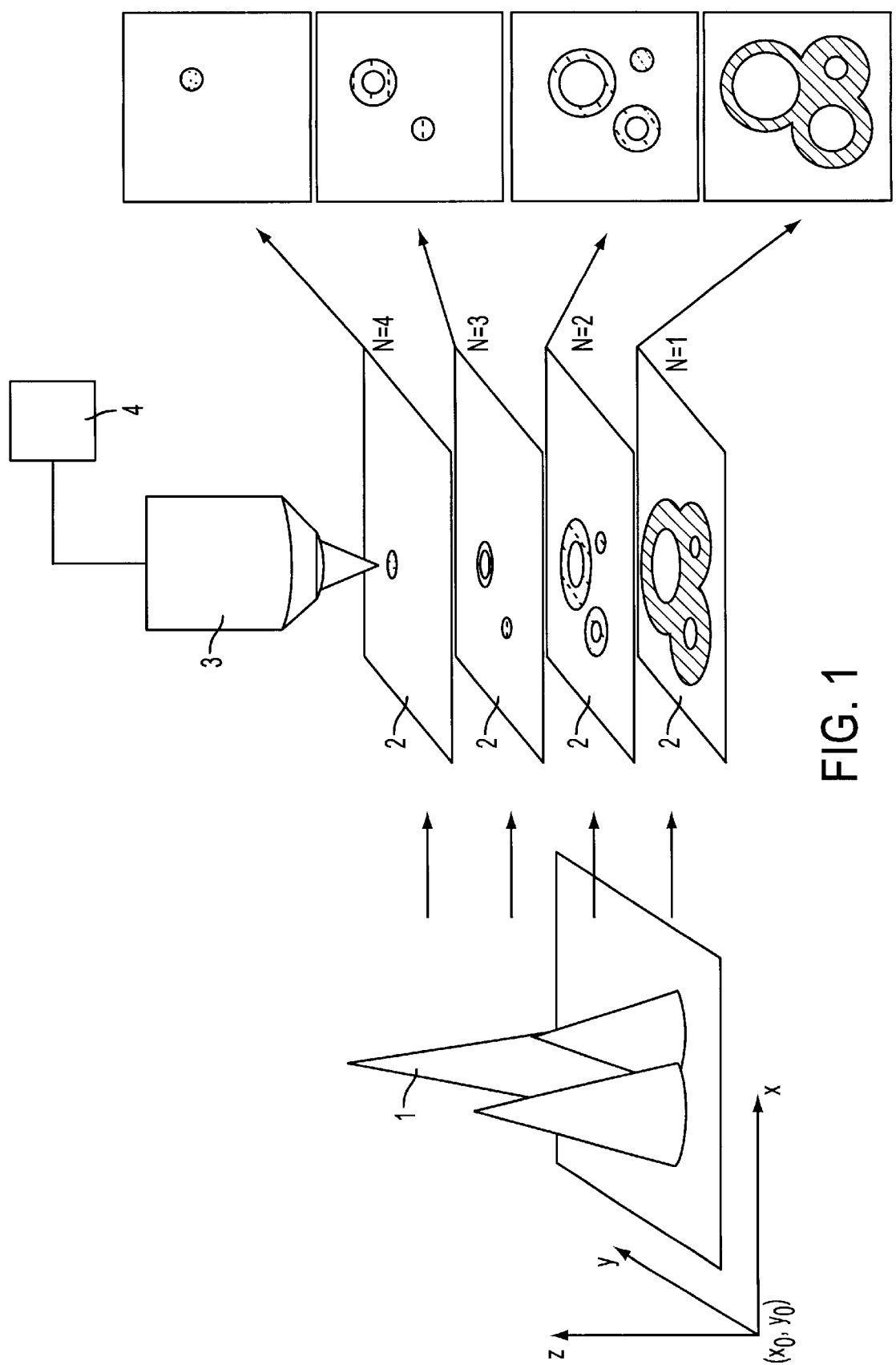
FIG. 1 shows a specimen and acquired images of the specimen in various specimen planes.

In a first exemplary embodiment as shown in FIG. 1, a total of n images of a specimen 1 are acquired using an image acquisition device 3 that comprises e.g. an incident-light microscope and a camera, by moving the microscope stage n times in the z direction over equidistant spacings dz, and are stored in digitized form in a computer 4. Preferably the distances dz are approximately of the order of magnitude of the depth of the focus of the microscope. The position of specimen 1 in the horizontal plane remains unchanged in this context. The result is to create a series of n images that will hereinafter be called the "image stack." In addition, instead of moving the microscope stage, it is also possible to move image acquisition device 3 or parts thereof (e.g. zoom lenses) in order to focus on different specimen planes 2. Of course, also a piezo drive can be used for very small spacings dz.

On the left side of FIG. 1, three cones are depicted as specimen 1. The base regions of the cones partially merge with one another, so that in this region the surface structure of specimen 1 is somewhat more complex than the surface of a separate cone.

Four planes 2 having plane numbers N=1 to N=4, which represent different horizontal cross sections of specimen 1, are shown by way of example in the middle and on the right side of FIG. 1. Each plane 2 contains regions that are sharply imaged by image acquisition apparatus 3. They are depicted with different crosshatching for each plane. All other surrounding regions are imaged unsharply. The division into sharply and unsharply imaged regions is different in each plane 2, and of course depends on the specimen. The spacing dz of planes 2 should be no greater than the depth of focus of image acquisition apparatus 3. If this rule is observed and if there is a sufficient number of planes 2, superimposition of only the sharply imaged regions of each plane 2 then yields a completely sharp image.

Figure 2:
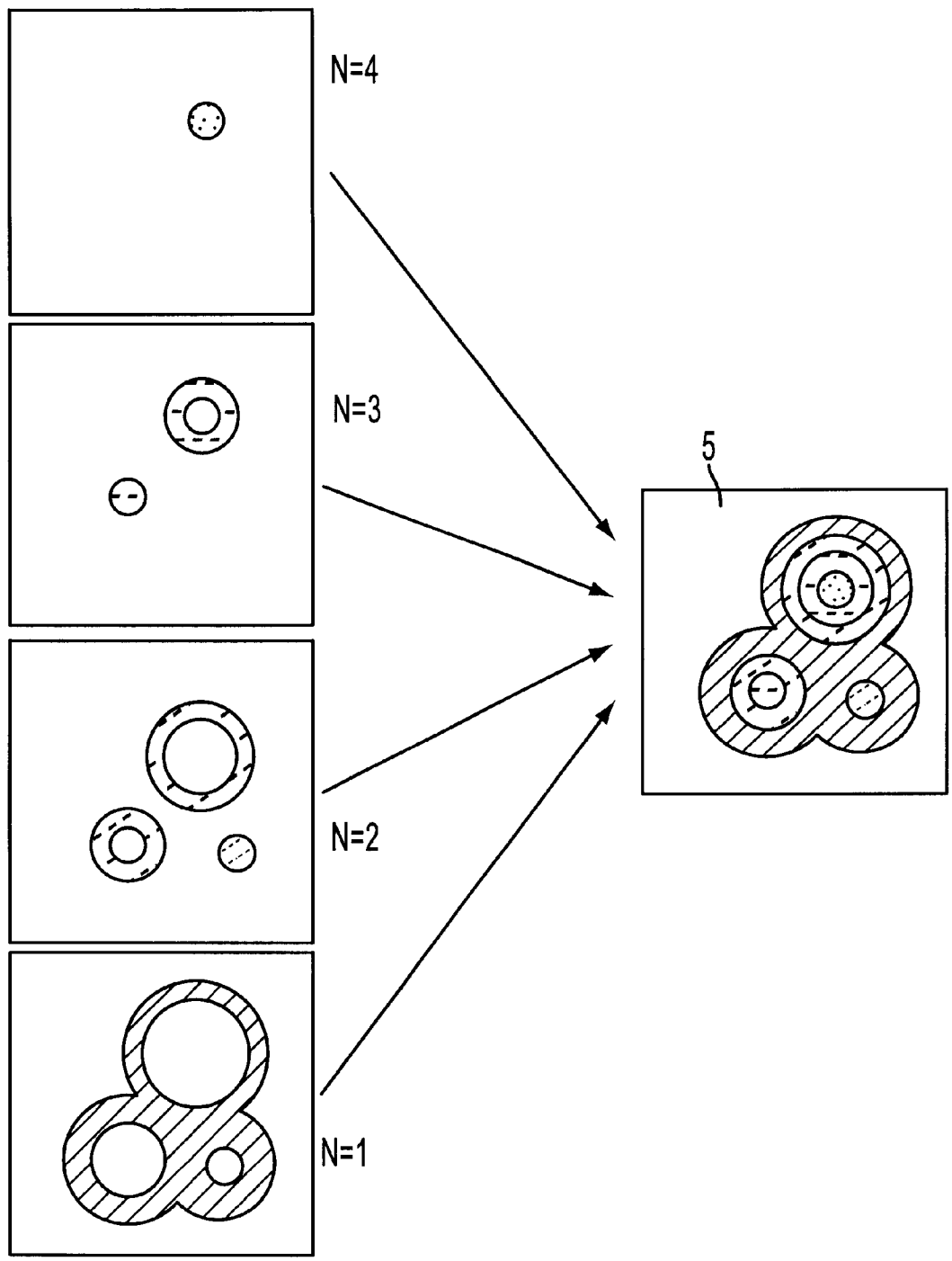
FIG. 2 shows the creation of a mask image from the data in the specimen planes.

This superimposition to yield a two-dimensional image containing only sharply imaged regions is depicted on the right side of FIG. 2 and is referred to as mask image 5. The different crosshatchings in mask image 5 correspond to the crosshatchings depicted in FIG. 1 for the various planes 2.

In the method proposed here, a three-dimensionally sharp image of the entire specimen 1 in which the individual pixels of the image contain the corresponding gray values is not directly calculated; instead, a mask image 5 that contains plane numbers N, and is prepared as explained below, is created.

Figure 3:
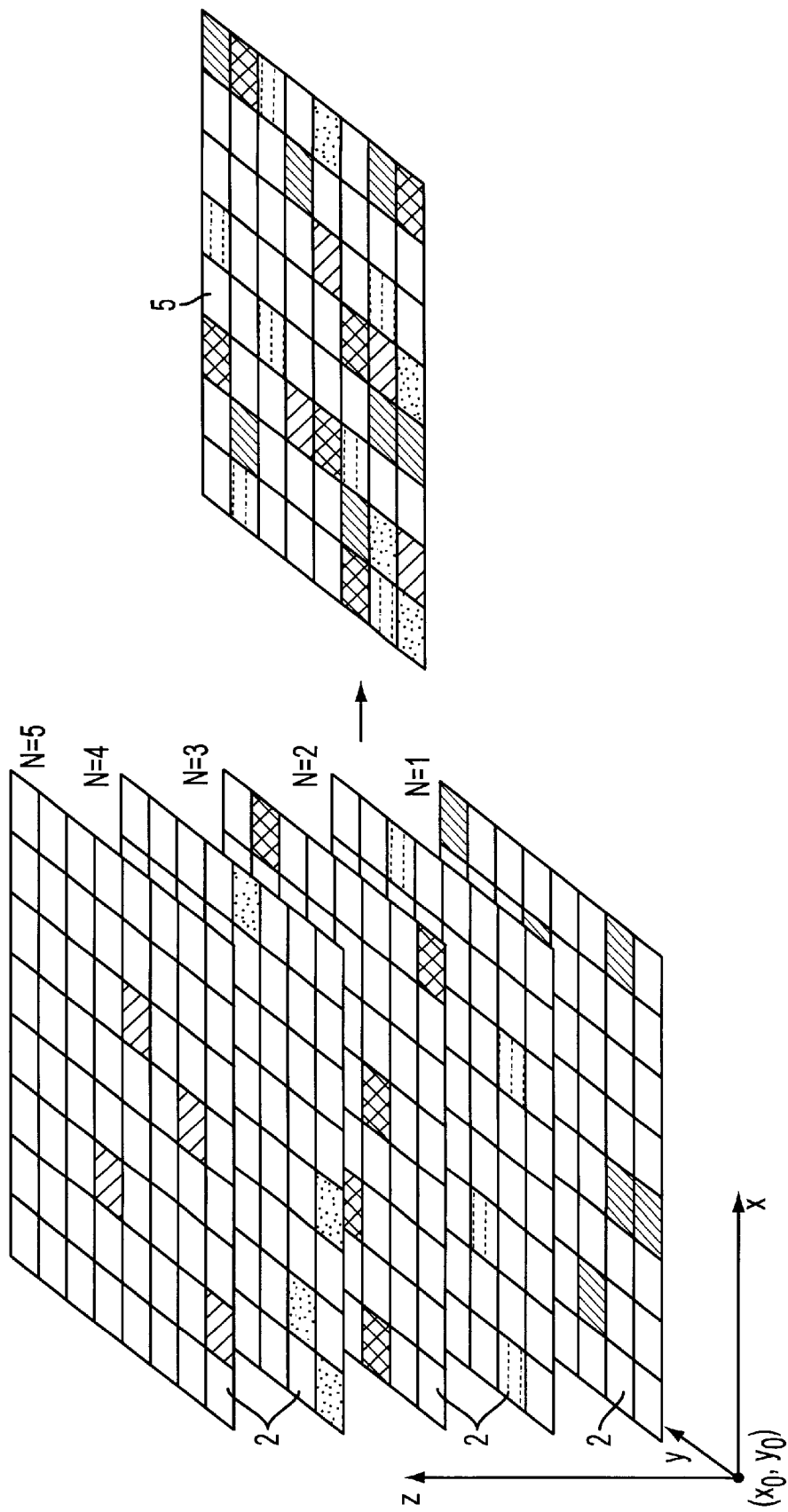
FIG. 3 shows a pixel-scale detail view of the imaged specimen planes.

FIG. 3 depicts in detail the individual planes 2; the individual boxes in planes 2 denote the pixels of the acquired images in the image stack. These pixels contain gray values as image data. For each x, y position in the x, y, z coordinate system, the image stack is searched in the z direction for that pixel which best images the relevant specimen structure. A "best image" can be determined using various criteria. One criterion often used, for example, is the contrast or sharpness of the image. A contrast function can therefore be used to look for the greatest contrast in the image stack at the (x, y) coordinate. That pixel which meets the corresponding conditions is designated as the "best pixel," and determines plane number N in the image stack at the (x, y) coordinate. That number N of plane 2 is assigned to the (x, y) coordinate and stored in mask image 5.

If this procedure is performed for each x, y coordinate, a complete mask image 5 is generated. In FIG. 3, each of the "best pixels" is given a specific crosshatching that corresponds to the respective plane number N. For each x, y coordinate, the associated plane number N is therefore present in mask image 5. Mask image 5 shown on the right side of FIG. 3 is therefore defined by the function N(x, y) at the discrete values (x, y). In the method according to the present invention, the gray values of the pixels that are usually stored in a final image are replaced by plane numbers N.

In a two-dimensional mask image 5 created in this fashion, the same plane number N can of course be entered at multiple (x, y) coordinate points. In other words, the calculation criterion for the "best pixel" is met at multiple (x, y) coordinate points in a single plane 2. The overall result is that mask image 5 contains all the "best pixels" and therefore the elevation information for specimen 1.

The total number n of planes 2 used and of images generated can vary from only a few planes 2 to several hundred planes 2. The total number n of planes 2 depends on the size of specimen 1, the requirements in terms of resolution in the z direction, and the depth of focus of the optical system of image acquisition apparatus 3, and can be selected appropriately or also set automatically.

In addition, each plane 2 can also be recorded using several images. For example, several tens or even several hundreds of individual images can be acquired in one plane 2. These individual images of a plane 2 are first assembled into a mosaic image. If this is done for each plane 2, an image stack of mosaic images is then generated. This image stack can in turn be processed using the method described above, and a mask image 5 can be created.

There are a plurality of known criteria and methods for identifying the "best pixel" based on predetermined criteria in the method according to the present invention. Contrast methods are very often used. Locally effective contrast methods or focus functions are particularly advantageous in this context.

Figure 4:
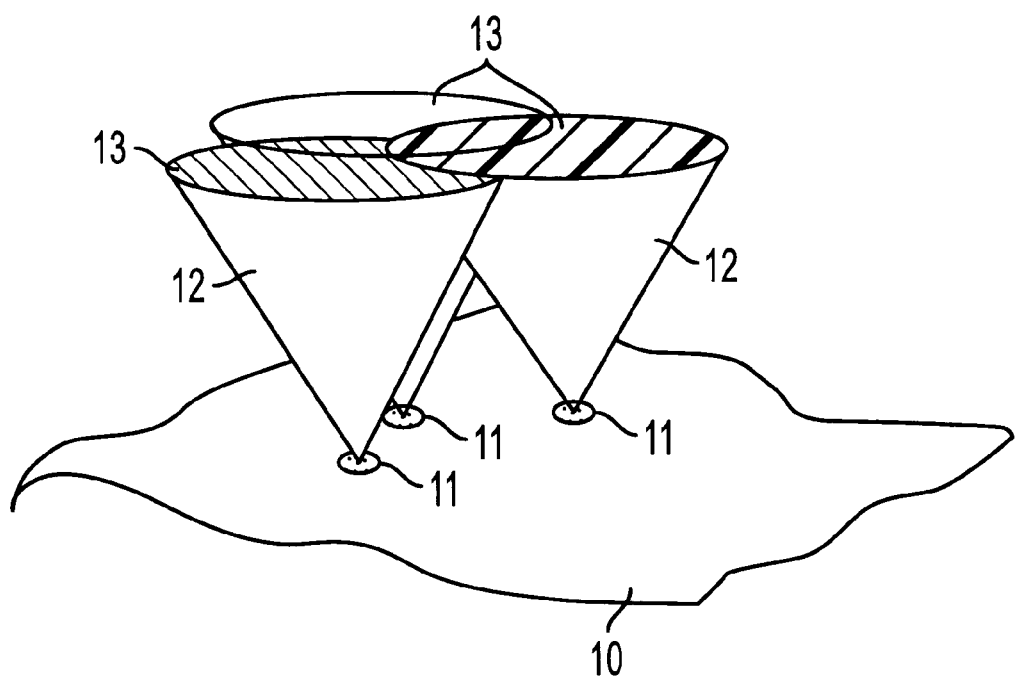
FIG. 4 shows cones of light to explain pseudocontrast.

With regard to identification of the "best pixel," the manner in which the light emissions from surface points 11 become superimposed with increasing distance from the surface 10 is visible in FIG. 4. The "light disks" 13 become larger and larger as the distance increases. This is perceived by a viewer as unsharpness. In the image stack, "best pixels"—i.e. those that image the surface 10 and are not the result of adjacent superimpositions—must exist in each image region. In order to find these regions, the local contrast is determined for each image point of the image stack. The result is a contrast function in the z direction for each (x, y) coordinate.

It should be noted that an unequivocal contrast maximum is not always present at those points where a "best pixel" is also present. This phenomenon may be explained by so-called "pseudocontrast" existing outside the image plane of the "best pixel." Pseudocontrast is created by the superimposition of the light contributions from adjacent surface points 11 (overlapping light cones 12; see FIG. 4). If these equivocal instances occur, they can be eliminated by way of an empirically developed expert program.

It is assumed for operation of the method that specimens 1 to be reconstructed possess sufficient local contrast/texture. Without any contrast, specimen structures cannot be recognized. Other methods such as phase contrast may, however, be helpful here.

Once calculation and assignment of the "best pixel" has been performed, i.e. transformation of the three-dimensional structures of specimen 1 onto the two-dimensional mask image 5, mask image 5 contains all the 3D data. The advantage of mask image generation is that the 3D information is, in a way, present in coded form as a "gray value" image in two dimensions. The x, y position within mask image 5 encodes the horizontal plane, and "gray values" N encode the vertical direction z. It is therefore possible to employ standard two-dimensional image analysis techniques, for example in order to improve and smooth the three-dimensional structures of specimen 1.

Since the elevation data are present in mask image 5 in coded form as "gray values" (in this case the "gray value" indicates the number N of the plane in which the "best pixel" is located), mask image 5 can be subjected to any known image processing procedure. Smoothing can be applied, edges can be emphasized, or average elevation values can be generated. Noise can be removed, for example by median filtering. It is thus possible to use many useful two-dimensional image processing algorithms that have already been developed and are well understood. Three-dimensional image processing techniques (e.g. surface fitting), which entail a great deal of computation effort and enormous data volumes, and moreover require a correspondingly long calculation time, are thus not necessary.

For reconstruction and display of the elevation information of specimen 1 present in mask image 5, mask image 5 can be reconstructed in various ways and displayed on a screen. In the simplest case, mask image 5 can be displayed on a screen as a number matrix. Plane numbers N indicate the elevations of specimen 1 at the corresponding point in the number matrix.

Better visualization of the information in mask image 5 is achieved by graphical processing. In the three-dimensional depiction of mask image 5, plane numbers N are plotted in the z direction. An illustrative 3D profile of specimen 1 is obtained as a reconstruction. If plane spacings dz are also taken into account (note that if plane spaces dz are constant, plane numbers N simply need to be multiplied by dz), the result is a 3D depiction, complete with measured values, of the surface profile of specimen 1. In this depiction, the elevation value pertaining to each (x, y) coordinate can be read off from the 3D depiction.

Of course it is also possible to move a cursor to an (x, y) coordinate on the screen and automatically have the associated elevation value displayed on the screen, for example directly next to the cursor, as a numerical value with length indication. A user can thus obtain a display of the specimen's elevation at any point.

Figure 5:
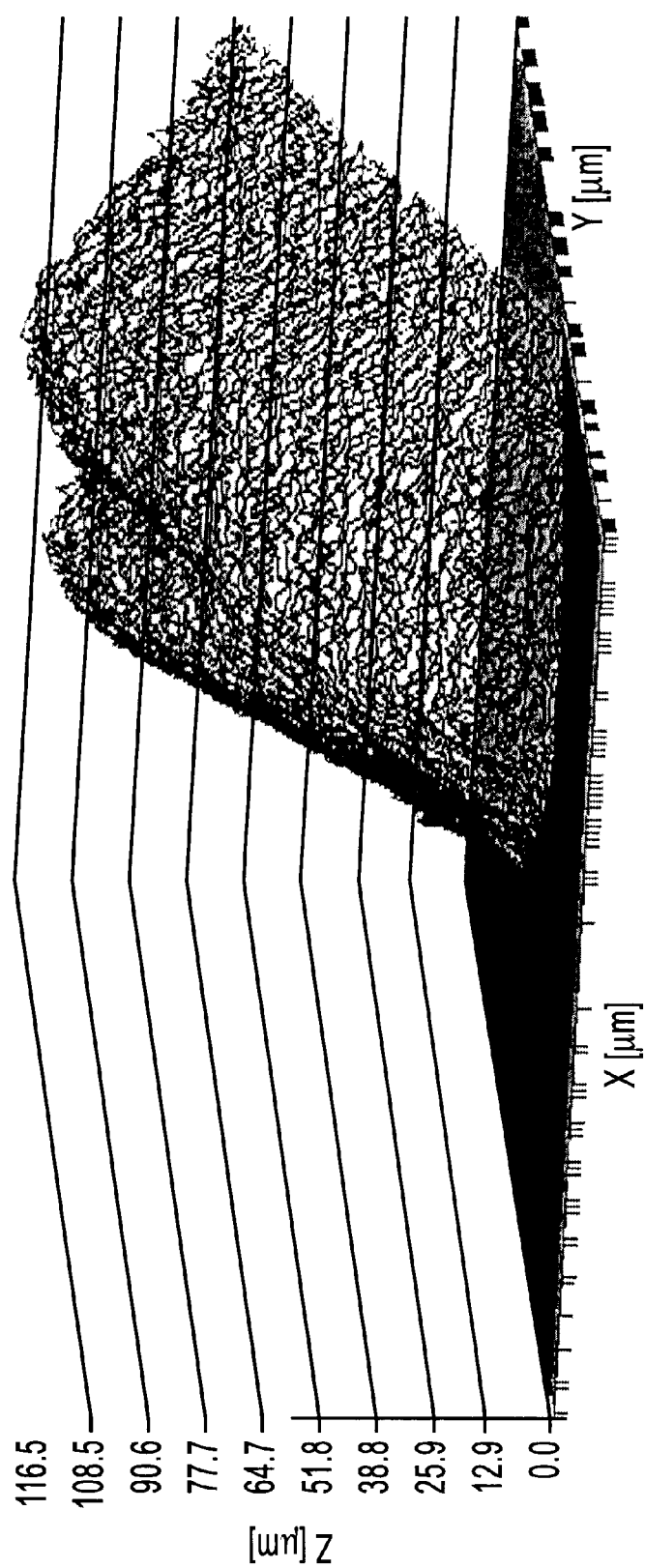
FIG. 5 shows a reconstructed surface profile of an imaged specimen.

FIG. 5 shows a three-dimensional reconstruction, obtained in this fashion, of a solder contact on a semiconductor circuit (IC).

In order to measure larger structures and surface profiles for which a microscope is not suitable, a macroscope can be used instead of the microscope. In a macroscope, the stage on which the specimen is mounted can be held immovably, and in this case the operation of focusing onto different planes of the specimen is accomplished by displacement of the optical system. By imaging the specimen in different planes, the surface profile of the specimen can be obtained by means of the method according to the present invention.

On the other hand, however, the image acquisition apparatus can comprise simply a normal camera with which images at different distances can be obtained. Since a distortion occurs in images of specimens at greater distances as compared to images at shorter distances, this distance-dependent distortion must also be taken into account and incorporated as a corresponding correction at the coordinate points (x, y). Of course specimens can be imaged not only in the vertical direction. In particular when only a camera is used, it can also be held horizontally so that profiles of three-dimensional objects on a wall can be acquired. This also corresponds to a distance profile. In general, therefore, the distances to different objects, for example in a landscape, can also be ascertained.

| | |
|---|---|
| 1 | Specimen |
| 2 | Planes of focus |
| 3 | Image acquisition apparatus |
| 4 | Computer |
| 5 | Mask image |
| 10 | Surface |
| 11 | Surface point |
| 12 | Light cone |
| 13 | Light disk |

What is claimed is:

1. A method for optical measurement of a surface profile of a specimen in a three-dimensional coordinate system (x, y, z), characterized by the following steps:

acquiring a series of n images of the specimen in different planes in the z direction by means of an image acquisition apparatus, each plane containing a plurality of coordinate points (x, y);

assigning each of the images to a plane in the specimen having a defined plane number (N);

referring each plane to a common origin $(x_0, y_0)$ in the coordinate system (x, y, z); and generating a mask image using the following procedure for each coordinate point (x, y):

comparing the image contents of all n images at that coordinate point (x, y) to one another in order to determine a plane therefrom according to predetermined criteria, assign its plane number to that coordinate point (x, y), and store it in the mask image.

2. The method as defined in claim 1, wherein constant spacings between the planes are set.

3. The method as defined in claim 1, wherein the spacings between the planes are of the order of magnitude of the depth of focus of the image acquisition apparatus.

4. The method as defined in claim 1, wherein a two-dimensional image processing procedure is applied to the mask image.

5. The method as defined in claim 1, wherein a three-dimensional image is reconstructed from the mask image.

6. An apparatus for optical measurement of a surface profile of a specimen, having:

an image acquisition apparatus for acquiring a series of n images of the specimen in various planes in the z direction of a coordinate system (x, y, z), each of the images being assigned to a plane in the specimen having a defined plane number, and each plane being referred to a common origin ($x_0$, $y_0$) and each plane containing a plurality of coordinate points (x, y); and having a computer that, for each coordinate point (x, y), compares the image contents of all n images at that coordinate point (x, y) to one another in order to determine a plane therefrom according to predetermined criteria and assign its plane number (N) to that coordinate point (x, y) and store it as a mask image.

7. The apparatus as defined in claim 6, wherein the image acquisition apparatus is a microscope with a camera.

8. The apparatus as defined in claim 7, wherein for acquisition of the series of n images of the specimen, an adjustment apparatus is provided for changing the spacing between the objective of the microscope and the specimen.

9. The apparatus as defined in claim 7, wherein the adjustment apparatus is the height adjustment system of the microscope stage.

10. The apparatus as defined in claim 6, wherein the image acquisition apparatus is a camera or macroscope with a camera.

11. An apparatus for optical measurement of a surface profile of a specimen, having:

an image acquisition apparatus for acquiring a series of n images of the specimen in various planes in the z direction of a coordinate system (x, y, z), each of the images being assigned to a plane in the specimen having a defined plane number, and each plane being referred to a common origin ($x_0$, $y_0$) and each plane containing a plurality of coordinate points (x, y); and having a computer comprising a central processing unit and a memory storage unit, said memory storage unit containing instructions capable of being read by the central processing unit which, for each coordinate point (x, y), compares the image contents of all n images at that coordinate point (x, y) to one another in order to determine a plane therefrom according to predetermined criteria and assign its plane number (N) to that coordinate point (x, y) and store it as a mask image.

12. An apparatus for optical measurement of a surface profile of a specimen, having:

an image acquisition apparatus for acquiring a series of n images of the specimen in various planes in the z direction of a coordinate system (x, y, z), each of the images being assigned to a plane in the specimen having a defined plane number, and each plane being referred to a common origin ($x_0$, $y_0$) and each plane containing a plurality of coordinate points (x, y); and having means for comparing, for each coordinate point (x, y), the image contents of all n images at that coordinate point (x, y) to one another in order to determine a plane therefrom according to predetermined criteria and assign its plane number (N) to that coordinate point (x, y) and store it as a mask image.

* * * * *